Jan. 5, 1965 E. W. SWENSON ETAL Re. 25,709

DUMP TRUCK WITH CONVEYOR AND SPREADER

Original Filed Jan. 9, 1958 7 Sheets-Sheet 1

Inventors
Eskil W. Swenson
Philip Swenson
By McCanna, Morsbach & Pillote
Atty's

DUMP TRUCK WITH CONVEYOR AND SPREADER

Original Filed Jan. 9, 1958 7 Sheets-Sheet 2

Inventors
Eskil W. Swenson
Philip Swenson
By McLanna, Morsbach & Pillote
Atty's

DUMP TRUCK WITH CONVEYOR AND SPREADER

Original Filed Jan. 9, 1958 7 Sheets-Sheet 3

Inventors
Eskil W. Swenson
By Philip Swenson
McCanna, Morsbach & Pillote
Atty's

DUMP TRUCK WITH CONVEYOR AND SPREADER

Original Filed Jan. 9, 1958 7 Sheets-Sheet 4

Inventors
Eskil W. Swenson
Philip Swenson
By
McCanna, Morsbach & Pillote
Attys

DUMP TRUCK WITH CONVEYOR AND SPREADER
Original Filed Jan. 9, 1958 7 Sheets-Sheet 5
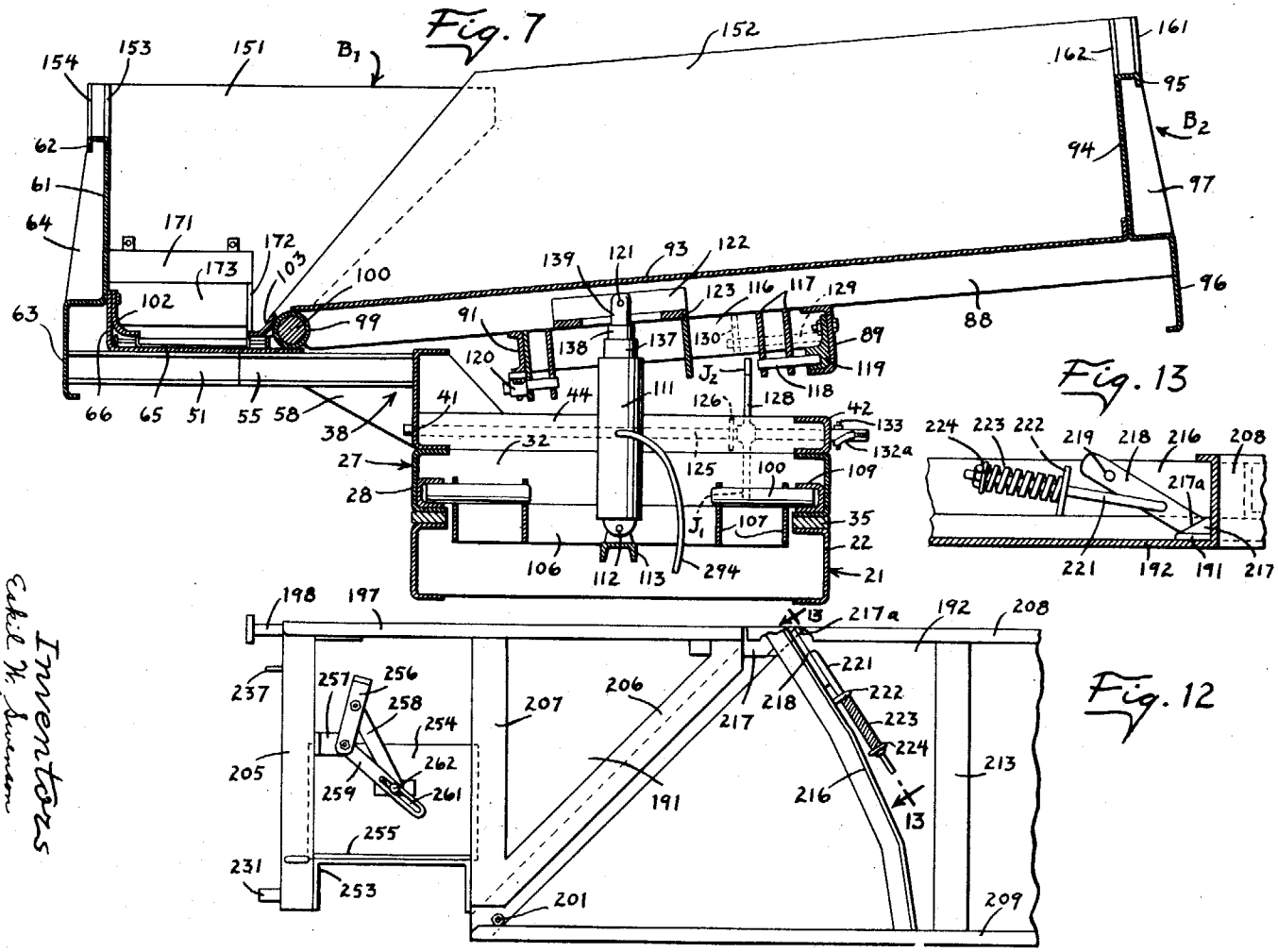
Inventors
Eskil W. Swenson
Philip Swenson
By McCanna, Morsbach & Pillote
Attys

DUMP TRUCK WITH CONVEYOR AND SPREADER

Original Filed Jan. 9, 1958 7 Sheets-Sheet 6

Inventors
Eskil W. Swenson
Philip Swenson
By
McCanna, Morsbach & Pillote
Atty's

DUMP TRUCK WITH CONVEYOR AND SPREADER
Original Filed Jan. 9, 1958 7 Sheets-Sheet 7
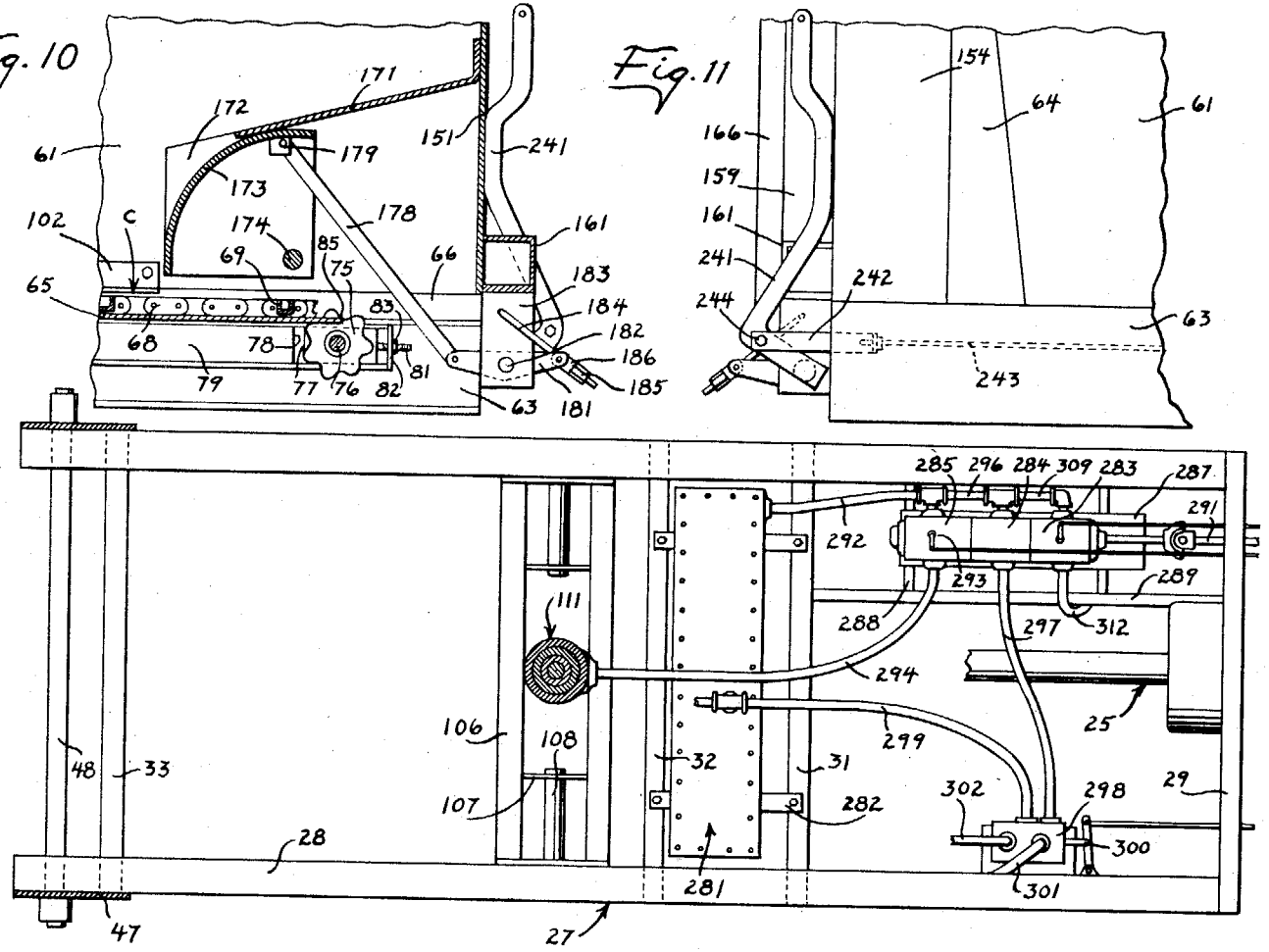
Inventors
Eskil W. Swenson
Philip Swenson
By McCanna, Morsbach & Pillote
Atty's United States Patent Office Re. 25,709
Reissued Jan. 5, 1965

25,709
DUMP TRUCK WITH CONVEYOR AND SPREADER

Eskil W. Swenson, Cherry Valley, and Philip Swenson, Lindenwood, Ill., assignors, by mesne assignments, to Swenson Spreader & Mfg. Co., a corporation of Illinois Original No. 3,010,727, dated Nov. 28, 1961, Ser. No. 707,978, Jan. 9, 1958. Application for reissue May 31, 1962, Ser. No. 200,025
29 Claims. (Cl. 275—8)

Matter enclosed in heavy brackets [ ] appears in the original patent but forms no part of this reissue specification; matter printed in italics indicates the additions made by reissue.

This invention relates to trucks and particularly to a dump truck having a conveyor and means for spreading pulverulent and granular materials and the like.

It is the general object of this invention to provide an improved truck having a dump box mounted thereon which is operable as a conventional dump truck and which is also operable to convey material in the box to either the front or rear of the box whereby to permit spreading of material at the rear of the truck, intermediate the ends of the truck, or adjacent the front of the truck.

Another object of this invention is to provide a truck having a dump box and a conveyor for moving material along the box, which box is formed in a plurality of separate sections which are movable relative to each other to loosen the material in the box and prevent the material from bridging across the conveyor.

Another object of this invention is to provide a truck having a dump box mounted thereon arranged to be tilted rearwardly for operation as a dump truck and which is also arranged to be tilted laterally of the vehicle to convey the material in the box laterally thereof and thereby facilitate spreading of material from the truck.

Another object of this invention is to provide a truck having a dump box mounted thereon for rearward tilting movement and also for lateral tilting movement and having a common dump box raising mechanism which is selectively operable to tilt the box either rearwardly or laterally of the vehicle.

Another object of this invention is to provide a truck having a material receptacle or box thereon arranged to be tilted laterally of the vehicle to convey material to one side of the box and conveyor means operative to move the material at that side of the box either forwardly or rearwardly of the vehicle whereby to permit spreading of material from the box at a point either forwardly or rearwardly thereof.

A more particular object of this invention is to provide a truck having a multiple section dump box in which one section of the box is mounted on the vehicle for rearward tilting movement relative thereto and has a conveyor arranged to move material thereacross longitudinally of the vehicle, and a second section hingedly connected to the first section of the box and arranged for rearward tilting movement therewith and also for lateral tilting movement relative thereto to convey material laterally of the truck onto the conveyor.

A further object of this invention is to provide a truck in accordance with the foregoing object having an improved arrangement for hingedly connecting one section of the box to the other section thereof in such a manner as to prevent leakage of material between the box sections in any of the relative positions thereof Yet another object of this invention is to provide a truck having a multiple section dump box including a first section mounted on the vehicle for rearward tilting movement and a second section hingedly connected to the first section of the box for rearward tilting movement therewith and also for lateral tilting movement relative thereto, and in an improved multiple section end gate construction in which the separate portions of the end gate are arranged for relative pivotal movement during lateral tilting of the second section of the box relative to the first section and in which the separate portions of the end gate are mounted for horizontal swinging movement as a unit during rearward tilting movement of the box.

Still another object of this invention is to provide a mutiple section end gate constructed in accordance with the foregoing object and having an improved arrangement for bracing the separate portions of the end gate against lateral loads due to the weight of the material in the box, in all relative positions of the separate portions of the end gate.

A still further object of this invention is to provide an improved dump box construction for a truck having a conveyor for moving material thereacross and an improved arrangement for regulating the rate of discharge material by the conveyor from the box.

These, together with various ancillary objects and advantages of this invention will be more readily appreciated as the same becomes better understood by reference to the following detailed description when taken in connection with the accompanying drawings, wherein:

FIG. 7 is a transverse sectional view through the truck and dump box and illustrating the box in an intermediate laterally tilted position;

FIG. 8 is an enlarged horizontal sectional view, taken on the plane 8—8 of FIGURE 4 and illustrating the main support frame;

FIG. 10 is an enlarged fragmentary sectional view, taken on the plane 10—10 of FIGURE 3;

FIG. 11 is an enlarged fragmentary side elevational view of the forward portion of the dump box;

FIG. 12 is a fragmentary side elevational view of the rear end gate;

FIG. 13 is an enlarged fragmentary sectional view of the rear end gate, taken on the plane 13—13 of FIGURE 12.

Figure 1:
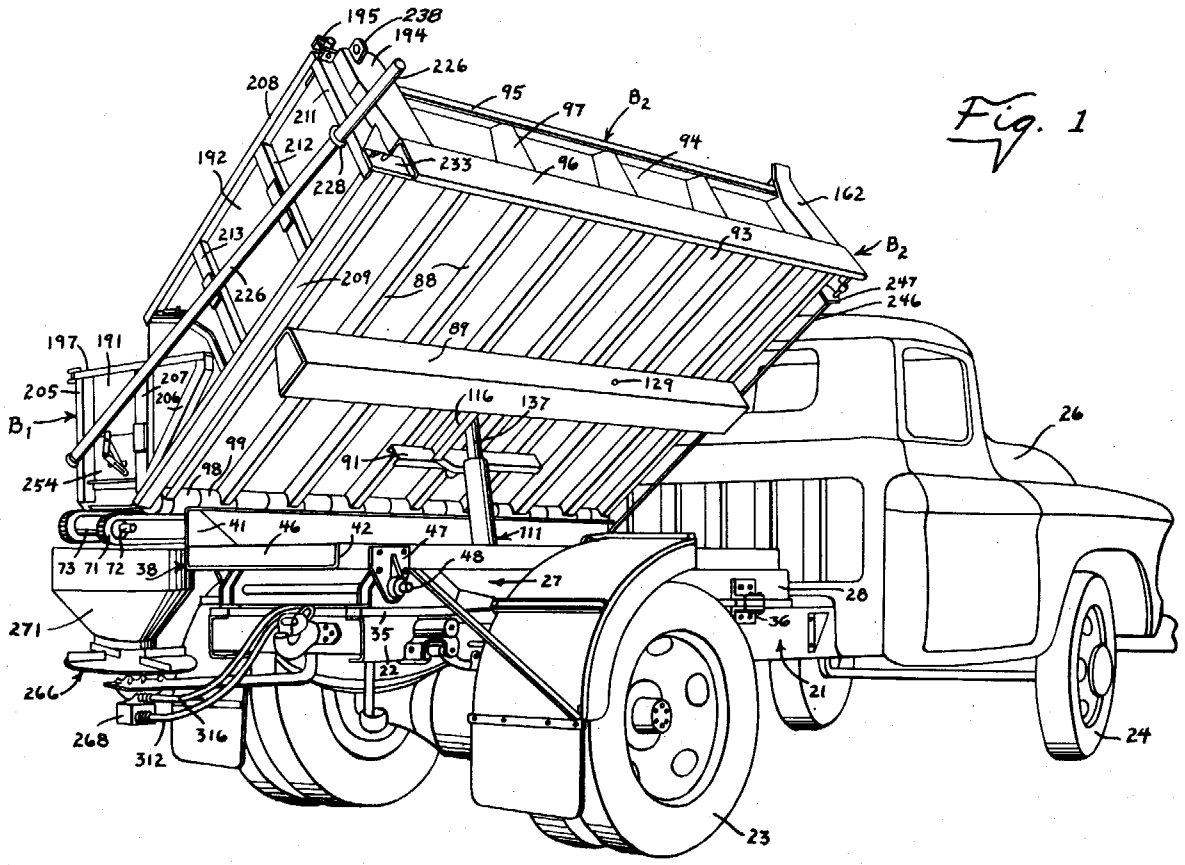
FIGURE 1 is a perspective view of the truck showing the dump box in its laterally tilted position.
Figure 2:
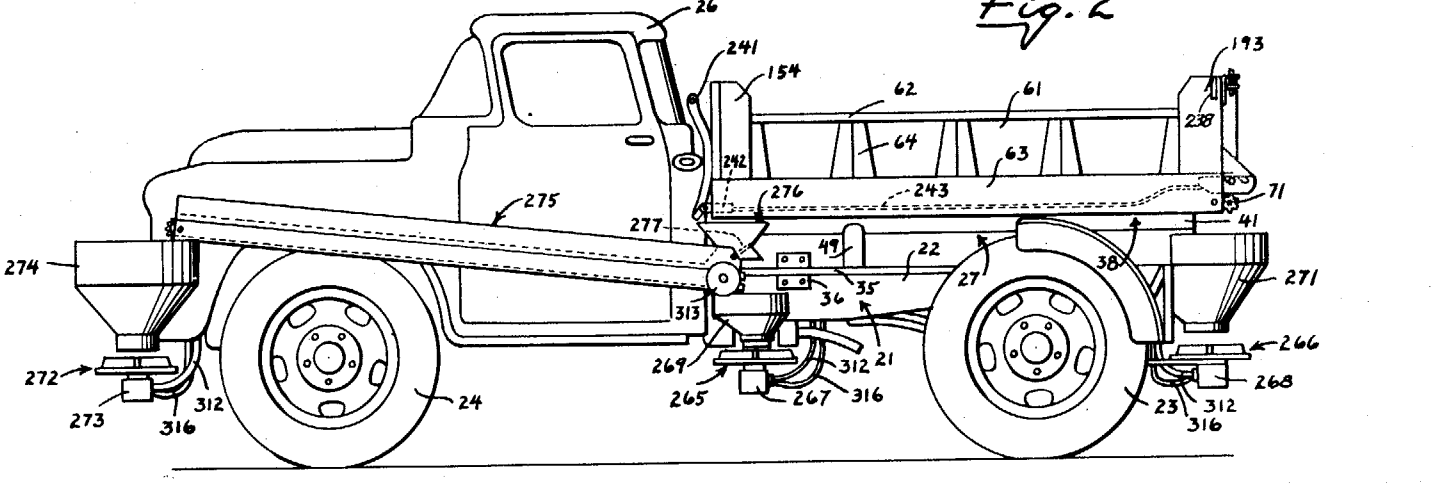
FIG. 2 is a side elevational view of the truck with the dump box in its lowered position.

In the preferred form of the invention herein disclosed there is illustrated in FIGS. 1 and 2, a conventional truck having a chassis 21 including spaced stringers 22 on which are mounted the rear drive wheels 23 and the forward steering wheels 24. An engine (not shown) is mounted on the chassis and drivingly connected to the rear wheels 23 by a conventional transmission and drive shaft 25 (see FIGS. 8 and 9) to propel the vehicle, and a cab 26 is mounted on the forward portion of the chassis.

The truck may be of any conventional construction, and accordingly further detailed description thereof is deemed unnecessary. In accordance with the present invention, a multiple section dump box including sections B1 and B2 is mounted on the truck in such a manner that the box may be tilted rearwardly as a unit to enable operation of the truck as a conventional dump truck, and which box is also so arranged as to enable lateral tilting of one section B2 of the box relative to the other section B1 thereof to convey material in the box to one side thereof. A conveyor C is mounted at that side of the box for moving material therein longitudinally of the truck and thereby permit spreading of the material either forwardly or rearwardly of the box.

Figure 4:
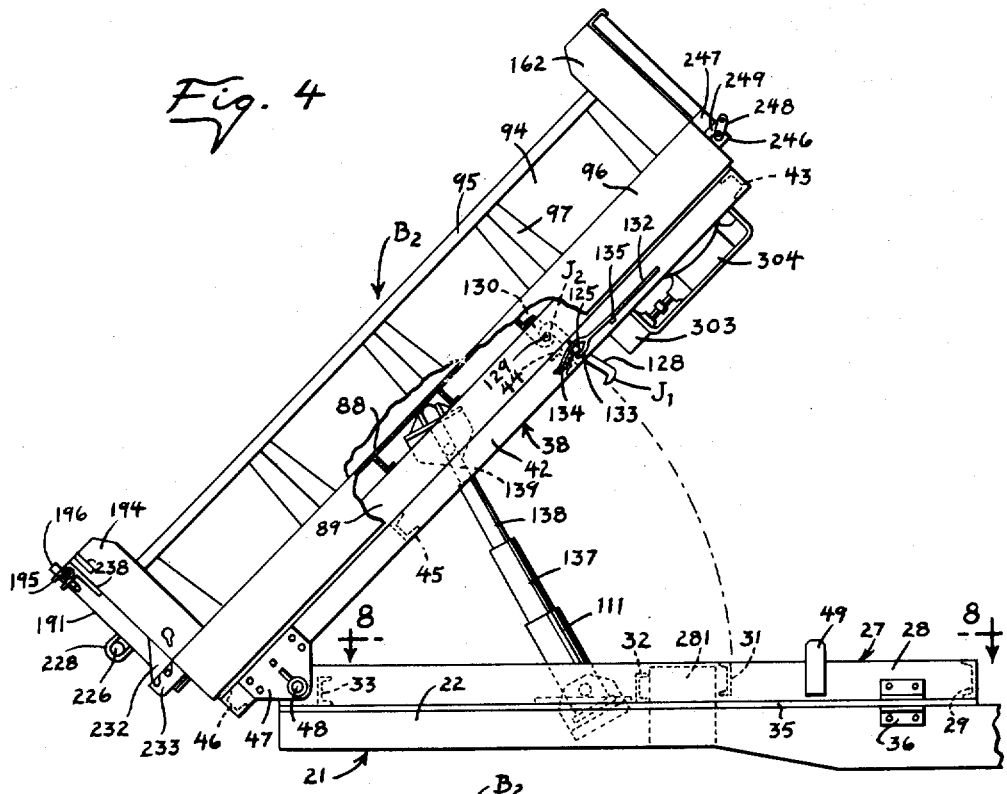
FIG. 4 is a fragmentary side elevational view of the truck illustrating the dump box in its rearwardly tilted position, and with parts broken away and shown in section to illustrate details of construction.

More particularly, the dump box unit includes a main support frame 27 adapted to be rigidly mounted on the vehicle chassis 21. As best shown in FIGURES 4 and 8, the main support frame includes spaced side rails 28 and a plurality of cross members secured to the side rails and extending therebetween to form a rigid frame. In the embodiment illustrated, there is provided a forward channel-shaped cross member 29, a pair of intermediate cross members 31 and 32 and a rear cross member 33. Strips 35 are interposed between the side rails 28 and the stringers 22, and clamps 36 are provided for rigidly clamping the side rails to the stringers.

Figure 9:
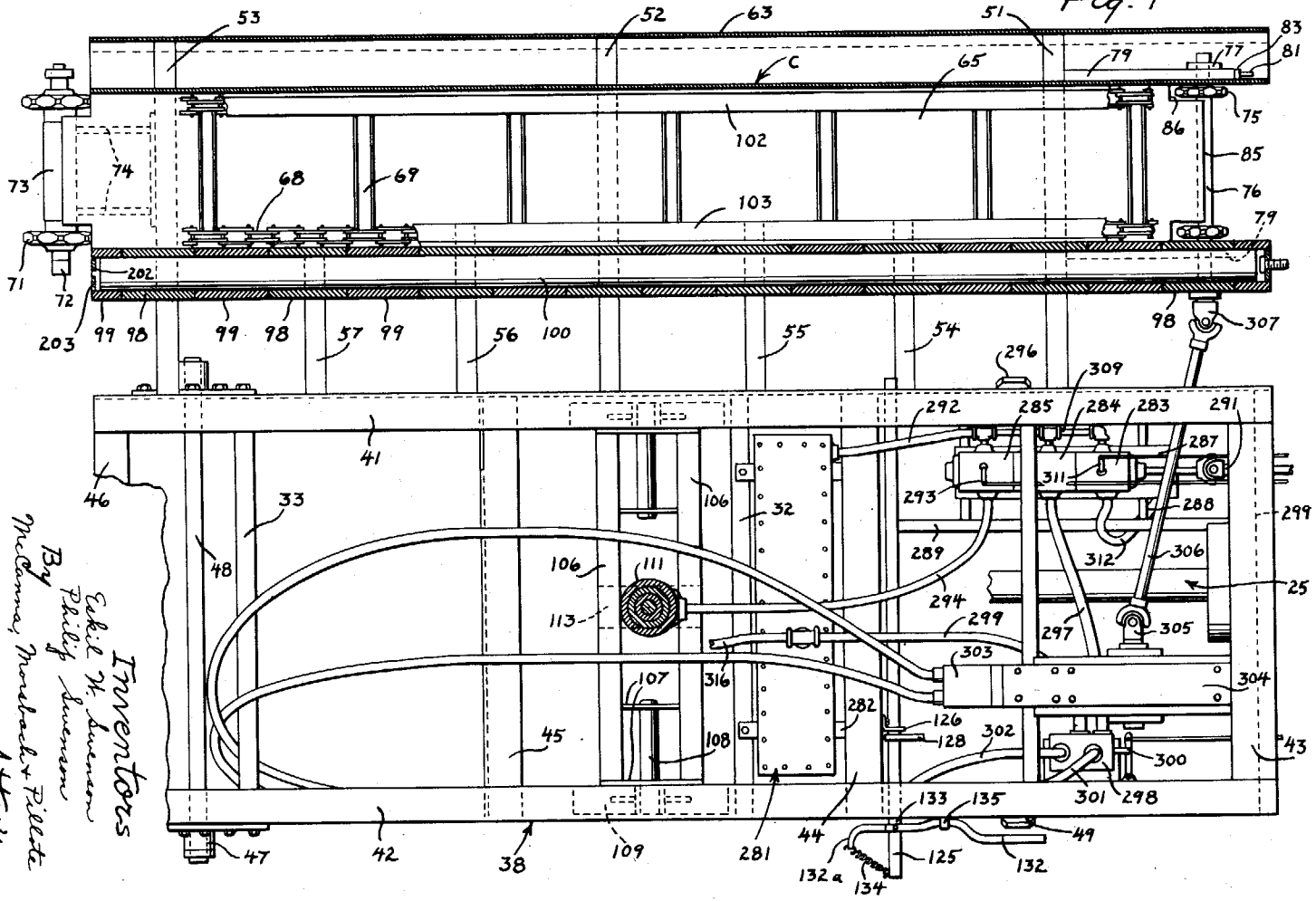
FIG. 9 is a horizontal sectional view taken on the plane 9—9 of FIGURE 6 and illustrating the lift frame and the conveyor mounted thereon.

A lift frame 38 is mounted on the support frame 27 for vertical pivotal movement about the rear end thereof. As best shown in FIGURES 4 and 9, the lift frame includes opposed side rails 41 and 42, which side rails are preferably spaced apart a distance corresponding to the spacing between the side rails 28 of the support frame 27 to rest thereon when the lift frame is in its lowered position. The side rails 41 and 42 have forward, intermediate and rear cross members 43–46 secured thereto and extending therebetween to thereby form a rigid framework. Hinge plates 47 are secured to the side rails 41 and 42 adjacent the rear ends thereof for the reception of a shaft 48 which is mounted in the side rails 28 of the main support frame, to thereby pivotally support the lift frame on the support frame for rearward tilting movement relative thereto. Guide fingers 49 are provided on the support frame 27 and arranged to engage opposite sides of the lift frame 38 to locate the latter in proper relation when the lift frame is in its lower position.

The dump box is mounted on the lift frame for rearward tilting movement therewith and, as previously described, the dump box includes a plurality of separate sections designated B1 and B2. The section B1 is rigidly supported on the lift frame for rearward tilting movement therewith and the other section B2 is hingedly connected to the lift frame for lateral tilting movement. A conveyor is mounted in the section B1 so that the material may be moved either forwardly or rearwardly of the box, as desired.

In the specific embodiment illustrated, the conveyor is mounted along one side of the dump box and for this purpose, a plurality of laterally extending arms 51, 52 and 53 (see FIG. 9) conveniently having an I-shaped cross-section, are welded to the side rail 41 of the lift frame and extend laterally therefrom. Auxiliary support arms 54–57, which are relatively shorter than the support arms 51–53, are also secured to the side rail 41 of the lift frame and extend laterally thereof. Reinforcing gussets 58 (see FIGS. 6 and 7) are preferably welded to the support arms and side rail 41 to brace the support arms.

Figures 6, 14:
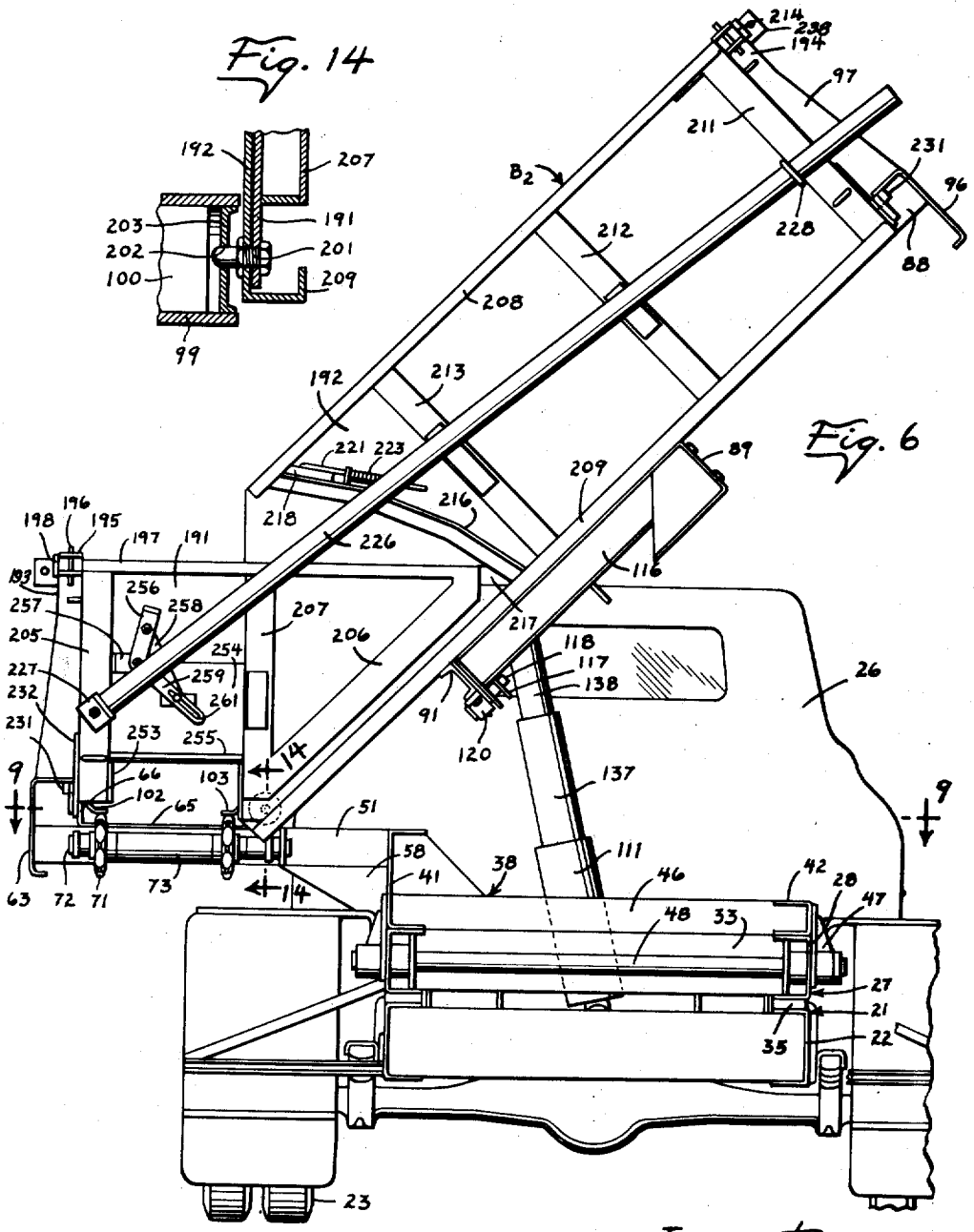
FIG. 6 is a rear elevational view of the dump truck with the box in its laterally tilted position.
FIG. 14 is an enlarged fragmentary sectional view through the rear end gate and dump box hinge assembly, taken on the plane 14—14 of FIGURE 6.

As best shown in FIGS. 6 and 7, the box section B1 includes a side wall 61 having a reinforcing flange 62 along the upper edge thereof and a longitudinally extending channel 63 along the lower edge thereof, which channel is welded or otherwise rigidly secured to the ends of the support arms 51–53. Generally V-shaped reinforcing ribs 64 are provided at longitudinally spaced points along the side wall and extend between the channel 63 and the flange 62 to reinforce the side wall. The dump box also includes a bottom panel 65 welded to the upper surfaces of the support arms 51–53 and having an upturned flange 66 thereon which is affixed to the side wall 61 and forms a continuation thereof.

The conveyor C is mounted for movement across the bottom panel 65 to move material longitudinally of the box. The conveyor may conveniently be of the belt type and, in the specific embodiment shown, includes a pair of spaced chains 68 (see FIG. 9) which are formed into a continuous loop and have a plurality of cleats or lugs 69 secured thereto at longitudinally spaced points for moving the material. The chains 68 are supported at the rear end of the box on sprockets 71, which sprockets are mounted on a shaft 72 journaled in a bearing 73. As best shown in FIG. 9, the bearing 73 is supported by a bracket 74 attached to the rear support arm 53. The forward ends of the chains 68 are entrained over sprockets 75 carried by a shaft 76. This shaft is supported in bearing blocks 77 which are adjustably mounted to permit adjustment of the tension on the chains. As best shown in FIG. 10, the blocks 77 are slidably received in openings 78 in the mounting brackets 79, which brackets are attached to the forward support arm 51 on the lift frame. A stud 81 is attached to the bearing block 77 and extends through a plate 82 overlying the end of the opening 78 to move the bearing block therealong as the nut 83 is tightened and loosened and thereby adjust the tension on the chains 68.

As is also shown in FIGS. 9 and 10, the bottom panel 65 terminates at a point adjacent the shaft 76 and rearwardly of the forward end of the side wall 61 to define a forward discharge opening 85. The bottom panel is notched, as indicated at 86, to receive the sprockets 75. A means, to be described more fully hereinafter, is provided for rotating the shaft 76 selectively in either direction to thereby move the conveyor over the bottom panel 65 to advance material therealong to a position either forwardly or rearwardly of the dump box.

The other section of the dump box designated B2 is hingedly connected to the lift frame 38 for vertical pivotal movement relative thereto about an axis extending longitudinally of the conveyor and disposed adjacent one side thereof whereby the box section B2 is operative to discharge material onto the conveyor. In the embodiment illustrated, the box section B2 includes a plurality of transversely extending rib members 88 which, as best shown in FIGURES 1 and 7, are welded to longitudinally extending frame members 89 and 91. The rib members 88 are supported on top of the lift frame stringer 41 and the frame member 89 is preferably arranged to be supported by the stringer 42 when the box is in its lowered position. With this arrangement, the stringer 42 is necessarily made shallower than the stringer 41 so that the combined vertical depth of the stringer 42 and the frame member 89 is the same as the depth of stringer 41.

The box section B2 also includes a bottom wall 93 which is welded or otherwise rigidly secured to the ribs 88 and an upstanding side wall 94 along one edge thereof. The side wall has a flange 95 along the upper edge and a channel-shaped portion 96 along the lower edge thereof, which channel-shaped portion is welded to the ends of ribs 88. Upright reinforcing ribs 97 are provided at longitudinally spaced points on the side wall 94 to rigidify the latter.

A piano-type hinge construction is provided for hingedly supporting the box section B1 on the lift frame 38. In particular, the hinge includes a first set of cylindrical sections 98 which are rigidly secured to the lift frame and a second set of cylindrical sections 99 each interposed between adjacent ones of the first sections 98 and rigidly secured to the box section B2. A hinge pin 100 extends through the cylindrical sections to form a piano-type hinge. As best shown in FIGURE 9, one of the hinge sections 98 is welded to each of the laterally extending arms 51–57 on the lift frame and one of the sections 98 is also affixed to the bracket 79 which supports the forward conveyor shaft 76. The other sections 99 of the hinge are each welded to the end of one of the ribs 88 on the box section B2 (see FIGURE 1).

As shown in FIGURE 7, the bottom wall 93 of the box section B2 is secured to the hinge sections 99 at a point angularly spaced from the point to which the bottom panel 65 of the section B1 is attached to the hinge sections 98, to thereby permit relative angular movement between the sections B1 and B2 without the bottom wall 93 engaging the bottom panel 65. Preferably, the bottom wall is arranged to overlie the uppermost portion of the hinge, when the box section B2 is in its lowered position, and the bottom panel 65 arranged so as to be disposed in a plane below the upper edge of the hinge to define a trough thereat. Chain guards 102 and 103 are provided on the box section B1 to overlie the conveyor chains 68. The guard 102 has a generally L-shaped cross-section and is attached to the side wall of the box at a point spaced above the conveyor chain. The guard 103 also has a generally L-shaped cross-section and is attached to alternate sections 98 of the hinge so as to remain stationary as the box section B2 is tilted laterally.

Provision is made for raising the dump box to either tilt the latter rearwardly or laterally of the truck, as desired. Although one operator could be provided for tilting the box rearwardly, and a separate operator provided for tilting the box laterally, it is preferable, for reasons of economy and also to prevent the box from simultaneously being tilted rearwardly as well as laterally, to use a common operator which is selectively operable to tilt the box in either direction. In accordance with the present invention, a single fluid operator is interposed between the main support frame 27 and the box section B2 and swivelly connected thereto. As shown in FIGS. 7, 8 and 9, there is provided a lower cradle including spaced side members 106 and tie members 107 extending therebetween. Trunnions 108 are attached to the tie members 107 and are rotatably supported in bearing blocks 109 affixed to the stringers 28 of the main support frame to support the cradle for swinging movement relative thereto about an axis transverse to the longitudinal axis of the support frame. The lower end of a fluid operator 111 is pivotally supported by a pin 112 on the crosspiece 113 attached to the channel members 106 for pivotal movement relative to the cradle about an axis extending longitudinally of the support frame. There is also provided an upper cradle including channel members 116 and tie plates 117 extending between the channel members. The trunnions 118 are attached to the tie plates 117 and rotatably supported in bearings 119 and 120, respectively, attached to the frame members 89 and 91 of the box section B2. The cradle is thus pivotally mounted on the box section for swinging movement about an axis transverse to the longitudinal axis thereof and the upper end of the fluid operator 111 is pivotally connected by a pin 121 to spaced ears 122 carried by crosspieces 123. As is apparent, the aforementioned construction provides a universal-type connection between the fluid operator 111 and each the main support frame 27 and the box section B2 so that the box section can tilt either laterally or rearwardly relative to the main support frame.

Provision is made for selectively locking the lift frame 38 to either the box section B2 or the main support frame 27 to selectively control the direction in which the box is tilted. This mechanism is best shown in FIGURES 4, 7 and 9 and includes a shaft 125 which is rotatably supported in the stringers 41 and 42 of the lift frame to extend transversely thereof. A supplemental support in the form of an L-shaped bracket 126 is provided intermediate the ends of the shaft 125 and affixed to the intermediate cross member 44 of the lift frame. A latch member 128 is non-rotatably attached to the shaft, adjacent the supplementary support 126, and has a lower jaw portion J1 adapted to engage the underside of the intermediate cross member 31 of the main support frame, to selectively lock the lift frame to the support frame. The latch member 128 also includes an upper jaw member J2 arranged to engage a pin 129 which extends between the frame member 89 and the support bracket 130 on the underside of the box section B2. The latch 128 is movable from a position engaging the pin 129 to a position engaging the cross member 31 on the support frame, and for this purpose an operating lever 132 is pivotally mounted by a pin 133 on the outwardly extending end of the shaft 125 for movement about an axis perpendicular to the shaft. The lever has a portion 132a which extends beyond the pivot point thereof and a spring 134 is attached to the end 132a and to the shaft 126 to yieldably urge the lever toward the stringer 42. A keeper 135 is provided on the stringer 42 and arranged to engage the lever 132, as is clearly shown in FIGURE 9. When the lever 132 is disposed on the underside of the keeper 135, the latch 128 is in a position such that the jaw J1 engages the cross member 31 and locks the lift frame to the support frame. The lever 132 may be manually pivoted outwardly about the pin 133 to disengage the keeper 135 whereupon the lever can be turned to rotate the shaft 125 to disengage the latch 128 from the cross member 31 and move the jaw J2 thereon into engagement with the pin 129. When the lever is released, the spring 134 is operative to urge the same toward the stringer 42 at the upper side of the keeper 135.

The specific fluid operator illustrated in the drawings includes a plurality of telescopically arranged piston members 137–139 to permit the operator to collapse into a relatively short overall length. This permits the fluid operator to be disposed in a substantially upright position, when the box section B2 is in its lowered position.

Figure 3:
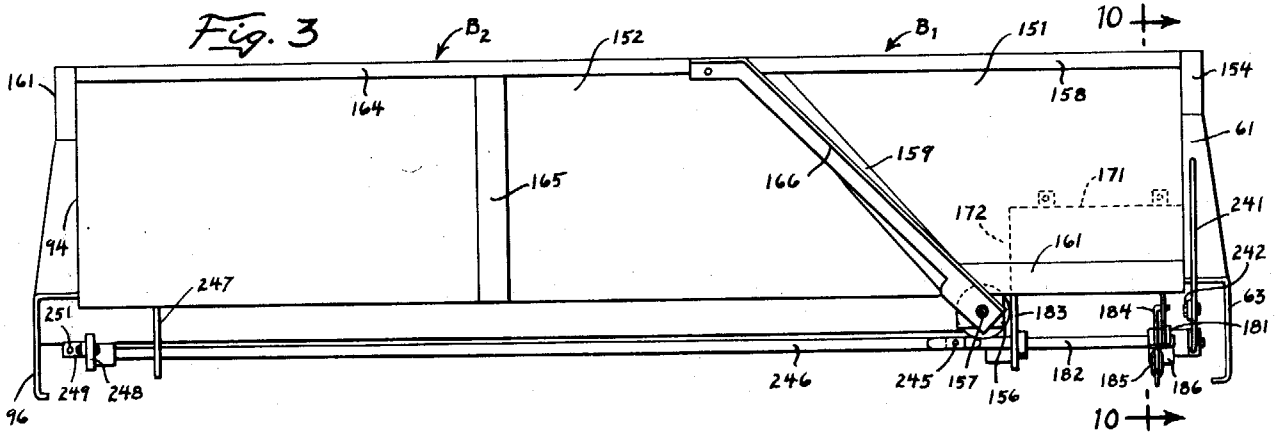
FIG. 3 is a front elevational view of the dump box illustrating the front end wall construction.

Reference is now made more specifically to the front end wall construction of the dump box, best shown in FIGS. 3 and 7. The front wall of the box includes a plurality of separate panels 151 and 152 which are respectively secured to the box sections B1 and B2 for movement therewith. In particular, the panel 151 has one side edge thereof welded or otherwise rigidly secured to the side wall 61. The front panel 151 is relatively higher than the side wall 61 and extension plates 153 and 154 are welded to the side wall and end wall to define a pocket therebetween for receiving extension side boards (not shown). The panel 151 extends crosswise of the box and has a depending tab 156 thereon which is pivotally mounted by a pin 157 secured to the hinge pin 100 in alignment with the axis thereof. The side edge of the panel 151 remote from the side wall 61 extends upwardly at an angle to the horizontal corresponding to the maximum angle to which the box section B2 can be elevated, as shown in FIGURE 6. A flange 158 is formed on the upper edge of the panel 151 and reinforcing channels 159 and 161 are welded to the outer face of the end panel along the side and bottom edges thereof.

The end panel 162 is welded to the side wall 94 and to the bottom wall 93 of the box section B2 for movement therewith. The end panel 152 is also higher than the side wall 94 and extension plates 161, 162 are welded to the side wall and end panel 152. A reinforcing flange 164 is formed on the upper edge of the end panel 152 and an upright reinforcing rib 165 is also provided on the end panel to rigidify the same. A brace arm 166 has one end thereof secured to the flange 164 adjacent the free edge of the end panel 152 and the other end thereof pivotally supported on the pin 157. As is apparent from FIGURE 3, the brace arm 166 is laterally spaced from the end panels 152 and is arranged to overlap the reinforcing channel 159 on the end panel 151 to guidably receive the latter as the box section B2 is tilted laterally.

As is best shown in FIGURE 10, provision is made for regulating the quantity of material dispensed by the conveyor through the forward dispensing opening 85 between the bottom wall and the front panel 151. For this purpose, a housing including a top wall 171 and opposed side walls 172 is attached to the end panel 151 and the side wall 61 of the box and extends rearwardly therefrom to overlie the forward end of the conveyor C. The top wall 171 terminates in spaced relation to the conveyor and a semi-cylindrical valve member 173 is pivotally mounted on pins 174 on the side walls of the housing. The valve member 173 closely underlies the top wall 171 and is movable relative thereto to vary the opening between the conveyor and the lower edge of the valve member.

In order to selectively adjust the position of the valve member 173, there is provided a link 178 having one end thereof pivotally attached to an ear 179 on the valve member and the other end thereof pivotally attached to a bell crank 181. The bell crank is mounted for rocking movement on a shaft 182, which shaft is journaled in depending brackets 183 attached to the reinforcing channel 161 on the front panel 151. An L-shaped member 186 is pivotally attached to the other end of the bell crank 181 and slidably receives a rod 184. One end of the rod 184 is attached to one of the depending brackets 183 and an adjusting nut 185 is threadedly attached to the other end of the rod 184. By turning the nut 185, the bell crank can be pivoted about the shaft 182 to thereby adjustably open or close the valve member 183.

A rear end gate is provided on the box and, as best shown in FIGS. 1, 6 and 12, includes a plurality of separate panels 191 and 192 adapted for movement in unison as a conventional tail gate, during dumping operations, and which are also adapted for relative pivotal movement when the box section B2 is tilted laterally of the truck. Rear extension plates 193 and 194 are provided on the side walls 61 and 94, respectively, and a clevis including a U-shaped member 195 and a latch pin 196 is provided on each of the extensions. The rear end gate panel 191 has a reinforcing flange 197 formed on the upper edge thereof and a trunnion 198 is attached to the end of the panel 191 adjacent the upper edge thereof to pivotally support the same in the clevis 195. The end gate panel 191 extends crosswise of the conveyor and a locating pin 201 (see FIG. 14) is attached to the panel. The locating pin is adapted to project into an opening 202 formed in a plate 203 carried by the end hinge section 99, which opening is aligned with the axis of the hinge to thereby support the panel 191 thereon. As is apparent from FIGURE 6, the edge of the end panel 191 remote from the side wall 61 extends upwardly at an angle to the horizontal corresponding to the maximum inclination of the box section B2. Reinforcing channels 205 and 206 are provided at opposite side edges of the panel 191 and an intermediate reinforcing channel 207 is provided adjacent the side of the conveyor.

The other end panel 192 has reinforcing flanges 208 and 209 formed on the upper and lower edges thereof and a plurality of upright reinforcing channels 211–213 extend between the flanges 208 and 209. A trunnion 214 is provided on the upper edge of the panel 192 and is pivotally supported in the clevis carried by the side wall 94. As is best shown in FIGS. 6, 12 and 14, the panels 191 and 192 are pivotally interconnected by the locating pin 201 whereby the panels are adapted to pivot relative to each other as the box section B2 is tilted laterally. Since the locating pin is adapted to be received in the opening 202 which is aligned with the axis of the hinge, it is apparent that the end gate panel 192 pivots relative to the panel 191 about the pivot axis of the box section B2.

The panel 191 of the rear end gate overlaps the outer face of the panel 192 and an arched guide bracket 216 is welded to the upper and lower flanges 208 and 209 on the panel 192 and in spaced relation to the outer face thereof. As is best shown in FIGURE 13, the guide bracket 216 is adapted to receive the tip portion of the end panel 191, as the box section B2 is tilted laterally.

A cam plate 217 is welded to the outer face of the panel 191, adjacent the upper tip thereof, which cam plate is beveled as shown in FIGURE 13 to provide a cam face 217A. A latch finger 218 is pivoted by a pin 219 for movement in a plane perpendicular to the panel 191 and has a nose portion thereon adapted to engage the cam surface 217A when the box section B2 is in its lowered position. A rod 221 is attached to the latch member 218, intermediate the pivot pin 219 and the nose portion thereon, and is slidably received in a bracket 222 on the guide bracket 216. A spring 223 is interposed between the bracket 222 and a collar 224 on the rod 221 to thereby yieldably urge the latch member 218 against the cam plate 217. The latch member 218 is arranged to normally maintain the end panels 191 and 192 in the position shown in FIGURE 12. However, when the box section B2 is elevated, the cam surface 217A on plate 217 is effective to cam the latch member outwardly against the bias of the spring 223 and permit relative pivotal movement of the end panels 191 and 192. When the box section B2 is again lowered, the latch member 218 is automatically relatched against the cam plate 217.

Provision is made for reinforcing the end panels 191 and 192 against lateral loads, in all of the operative positions of the end panels. For this purpose, a reinforcing member herein shown in the form of a pipe 226 has one end thereof pivotally attached by a bracket 227 to the upright reinforcing channel 205 on the end panel 191. The pipe 226 extends alongside the end panels 191 and 192 and the other end thereof is slidably supported in a yoke 228 carried by the other end panel 192. As is apparent when a lateral load is applied to the end gate, the end panels 191 and 192 engage the pipe 226, intermediate the ends thereof, and are supported thereby. As the box section B2 is tilted laterally, the pipe 226 pivots about the panel 121 and slides in the yoke 228, to accommodate the change in spacing between the pivot point and the yoke. However, in the raised position, the pipe 226 remains effective to reinforce the end gates against lateral load.

Figure 5:
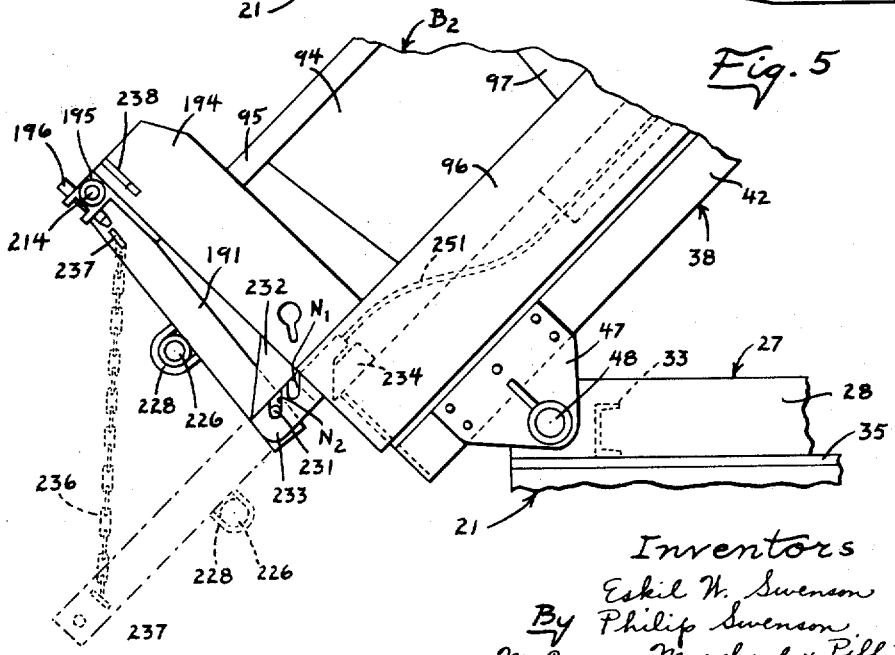
FIG. 5 is a fragmentary enlarged side elevational view of the rear portion of the dump box and illustrating the rear end gate in different operative positions thereof.

The rear end gate is normally maintained in a position closing the end of the dump box and for this purpose there are provided laterally extending locking pins 231 adjacent the relatively opposite ends of the panels 191 and 192. The pins 231 are located adjacent the lower edges of the respective panels and provision is made for engaging the pins to selectively lock the end gate in its closed position and for also pivotally supporting the pins 231 to permit the end gate to be swung downwardly from the solid line position shown in FIGURE 5 to the dotted line position shown in that figure. For this purpose, a gusset plate 232 is attached to each of the end walls 61 and 94 to project rearwardly therefrom, with the lower edge of the gusset plates overlying the locking pins 231 on the end gate. A latch bar or plate 233 is mounted to underlie the gusset plate 232 and has notches N1 and N2 therein which open at the upper side thereof to receive the locking pins 231. Each of the latch plates 233 is mounted for movement toward and away from the respective gusset plate 232 to disengage the latch pins 231. When the latch pins are released, the rear end gate is free to pivot outwardly about the trunnions 198 and 214 and permit dumping of material from the box when the latter is tilted rearwardly. In the specific embodiment illustrated, the latch plate 233 is slidably supported alongside the respective side wall and has a cam surface on the rear edge thereof adapted to engage a cam plate 234 which is operative to raise the latch plate 233 as it is retracted.

When it is desired to close the end of the box, the latch pin 231 is positioned in notch N1 in the latch plate 233, while the latter is in its extended position. When the latch plate is thereafter retracted, the end gate is drawn tightly against the box and the aforedescribed locating pin 201 drawn into the centering opening 202 in the piano-type hinge. In order to permit the end gate to be swung to a horizontal position as shown in dotted lines in FIGURE 5, it is necessary to first disengage the locating pin 201 from the opening 202 in plate 203 before swinging the end gate downwardly. For this purpose, the latch pins 231 are positioned in the notches N2 in the latch plates 233. When the latch plates 233 are retracted, the lower portion of the end gate will be spaced from the dump box, as shown in solid lines in FIGURE 5, whereupon the end gate may be lowered to the dotted line position by removing the keeper pins 196. A chain 236, or the like, may be provided for supporting the end gate, one end of the chain being attached by an eye 237 to the upper portion of the end gate and the other end of the chain being attached to a bracket 238 on the respective extension plate 194 on the dump box.

Provision is made for simultaneously extending and retracting the latch plates, 233 from a position adjacent the forward portion of the dump box. As shown in FIGS. 2, 3 and 11, a lever 241 is attached to the end of the shaft 182 and is operatively connected by means of a link 242 and a rod 243 to the latch plate 233 on the box section B1. The link 242 is pivotally attached to the lever 241 by a pin 244 and is movable, from the latched position thereof shown in FIGURE 11, in a counterclockwise direction to effect extension of the respective latch plate 233 on the box section B1. When the lever 241 is in its latched position, the pin 244 is disposed above the shaft 182 so that the tension on the rod 243 is effective to maintain the lever in its latched position abutting against the front end panel 151. As the lever is moved in a counterclockwise direction from the position shown in FIGURE 11, the pin 244 moves past the overcenter position with respect to the shaft 182 whereupon further movement of the lever effects extension of the respective cam plate 233.

The lever is non-rotatably connected to the shaft 182 so as to effect rotation of the shaft therewith. As shown in FIGURE 3, a second shaft 246 is pivotally attached to the other end of the shaft 182 by a pin 245 for movement about an axis parallel to the hinge axis of the section B2 and preferably spaced closely adjacent to the aforementioned hinge axis. The shaft 246 is aligned with the shaft 182, when the box section B2 is in its lowered position, and the other end of the shaft 246 is slidably and rotatably supported in a bracket 247 on the box section B2. A crank 248 (see FIGS. 3 and 4) is non-rotatably attached to the free end of the shaft 246 and is connected by a link 249 to a rod 251 which is otherwise operatively connected to the latch plate 233 on the box section B2. It is apparent that the aforedescribed arrangement is operative to simultaneously extend and retract the latch plates on the box sections B1 and B2. In addition, the shaft 246 is pivotally connected to the shaft 182 so as to permit raising of the shaft 246 with the box section B2, as the latter is tilted laterally. The slight misalignment between the pivot axis of the box section and the shaft 246 merely produces a slight sliding movement of the shaft 246 in the bracket 247.

The rear end gate panel 191 has a discharge opening 253 formed therein above the conveyor to permit the latter to discharge material from the rear end of the box, and a sliding valve plate 254 is mounted on the end panel 191 for regulating the amount of the material dispensed through the opening 253. Conveniently, the reinforcing channels 205 and 207 on the end gate may have the lower portions thereof spaced slightly from the end panel 191 to slidably receive the valve plate 254 therebetween and a flange 255 is provided on the lower end of the valve plate and dimensioned to be slidably received between the reinforcing channels 205 and 207 to maintain the valve plate centered therebetween. A valve plate operating lever 256 is pivoted on a bracket 257 carried by the channel 205 and is operatively connected by a link 258 to the valve plate to raise and lower the same as the lever 256 is operated. A locking arm 259 is attached to the bracket 257 and has a slotted end 261 for slidably receiving the bolt 262 on the valve plate. The bolt 262 is preferably tightened sufficient to frictionally engage the arm 259 and thereby retain the valve plate in any preselected adjusted position.

*The dump box defines a hopper for storing a quantity of pulverulent or granular material such as sand, salt, cinders, granular fertilizers and the like.* The conveyor on the dump box is operative to deliver material to a point adjacent the rear end if the truck, and at one side thereof, and also to a point adjacent the front end of the dump box, and at one side thereof. Accordingly, spreaders, herein shown on the rotary broadcast type and designated 265 and 266, are mounted on the truck, adjacent the forward and rear end of the dump box. Fluid motors 267 and 268 are provided for driving the spreaders 265 and 266, respectively, and hoppers 269 and 271 are disposed above the spreaders to convey the material from the conveyor onto the broadcast spreaders. Additionally, a spreader 272, herein shown of the broadcast type, may be mounted adjacent the front of the truck and driven by a fluid motor 273. A hopper 274 is disposed above the spreader and an auxiliary conveyor 275 is mounted alongside the truck and arranged to convey material from a point adjacent the forward end of the dump box to the hopper 274. A hopper 276 having a valve 277 therein is provided for collecting the material discharged from the forward end of the conveyor and for selectively delivering the same to either the auxiliary conveyor 275 or to the hopper 269 of the spreader 265. In this manner, material can be spread from the truck at a point either adjacent the front of the truck, intermediate the ends of the truck, or adjacent the rear of the truck as desired.

The several instrumentalities on the dump box and truck are preferably hydraulically operated and, as best shown in FIGS. 8 and 9, there is provided a fluid reservoir 281 which is disposed between intermediate cross members 31 and 32 on the main support frame 27 and is supported thereon by brackets 282. A plurality of fluid pumps 283–285 are mounted on the auxiliary support platform 287, which platform is supported on the main frame 27 by brackets 288 and 289. The pumps are conveniently driven from a common power take-off shaft 291.

Any suitable pump and valving arrangement may be provided. As shown in FIGURES 8 and 9, the pump 285 has its inlet connected through a conduit 292 to the reservoir 281 and is operative to deliver fluid under pressure through a valving mechanism (not shown) controlled by a valve operating lever 293 to a discharge conduit 294 connected to the hoist 111. As is conventional, the pump and valving arrangement 285 and 293 are arranged so as to permit selective delivery of fluid under pressure to the hydraulic operator 111 to elevate the dump box; to block flow through the conduit 294 and thereby maintain the box section B2 in any preselected elevated position, and to communicate the conduit 294 with the inlet conduit 292 and permit the box section B2 to lower to its initial position.

The pump 284 also has the inlet thereof connected through conduits 296 and 292 to the reservoir 281. The outlet of pump 284 is connected through a conduit 297 to a four-way valve 298. The valve 298 is conveniently mounted on the main support frame 27 and has an operator 300 therefor adapted to be remotely controlled. A fluid return line 299 is connected to the four-way valve 298 and to the reservoir 281 and the four-way valve is arranged to selectively control the flow of fluid between the discharge and return conduits 297 and 299 and the flexible conduits 301 and 302 connected to an hydraulic conveyor drive motor 303. The conveyor drive motor 303 is drivingly connected to a speed reducing mechanism 304 mounted on the lift frame 38 for movement therewith, and the flexible conduits 301 and 302 are arranged to extend from the valve 298 rearwardly along the main frame 27 to a point adjacent the pivot shaft 48 of the lift frame and thence forwardly along the lift frame to the drive motor, so as to not interfere with the raising and lowering of the lift frame. The speed reducing mechanism is connected through a universal joint 305, stub shaft 306 and universal joint 307 to the forward conveyor drive shaft 76 to drive the latter. The four-way valve 298 is operative to reversibly control the flows of fluid to the conveyor drive motor 303 to thereby selectively drive the conveyor in either direction to discharge material either at the forward or the rear end of the dump box.

One or more additional pumps such as the pump 283 may be provided for driving the broadcast type spreaders and the auxiliary conveyor 275. The pump 283 has the inlet thereof connected through conduits 309, 296 and 292 to the reservoir. Fluid under pressure is delivered from the pump 283, through a valve mechanism (not shown) controlled by an operating lever 311, to a discharge line 312. The discharge line may conveniently be selectively connected to either the fluid motor 267 to drive the intermediate broadcast spreader 265; to the fluid motor 268 to drive the rear broadcast spreader 266, or to the fluid motor 273 and the fluid motor 313 to respectively drive the forward broadcast spreader 272 and the auxiliary conveyor 275. As is conventional, fluid from the respective fluid motors is returned through a conduit 316 to the fluid reservoir.

From the foregoing it is thought that the operation of the truck will be readily understood. When the box is in its lowered position, it is operative as a conventional dump truck to receive material and to discharge the material through the rear end gate. When discharging material, the rear end gate is first unlatched by moving the tail gate operating lever 241 to its released position to thereby extend the latch plates 233 to a position to disengage the latch pins 231. The lever 132 is then moved to a position in which the jaw J2 on the latch 128 engages the pin 129 on the dump box section B2 to lock the dump box to the lift frame 38. The valve lever 293 is then operated to supply fluid under pressure from the pump 285 to the fluid operator 111 to elevate the box and lift frame 38 and thereby tilt the dump box rearwardly. As is conventional, the end gate swings outwardly under the weight of the material in the box. In this operation, the end panels 191 and 192 of the end gate are latched together by the latch mechanism 218 whereby the end gate swings as a unit into and out of a position closing the end of the dump box.

When it is desired to spread material from the box, the discharge line 312 from the pump 283 is connected to the fluid motor of the selected one of the spreaders 265, 266 and 272 to operate the same under the control of the valve operating lever 311. The four-way valve 298 is then operated to drive the main conveyor in a direction to deliver material from the box to the preselected spreader. The box section B2 can then be tilted laterally to deliver material to the conveyor and for this purpose the lever 132 is operated to move the jaw J1 on the latch 128 into engagement with the cross member 31 on the main support frame, to lock the lift frame thereto. The valve operating lever 293 is then operated to supply fluid under pressure to the hoist 111 and, since the box section B2 is unlocked from the lift section, the box section B2 will be tilted laterally. As the box section B2 is tilted laterally, the cam plate 217 on the tip of the end gate panel 191 cams the latch finger 218 outwardly whereupon the end panels 191 and 192 are free to pivot relative to each other. During this relative pivotal movement, the tip of the panel 191 is guidably received between the panel 192 and the arched guide bar 216.

Some finely granulated materials such as fertilizers and the like tend to compact or settle in the dump box, after the truck has traveled only a relatively short distance.

When the conveyor is operated to remove material from adjacent the bottom of the box, the material is so densely compacted therein that it arches or forms a "bridge" above the conveyor which inhibits the feeding of further material thereto. By making the box section B2 tiltable relative to the box section B1, the compacted material in the box can be readily broken up sufficient to prevent bridging. Thus, the box section B2 can be raised relative to the section B1 and then lowered to break up the material in the box and prevent bridging. In addition, the box section B2 can be elevated sufficient to convey all of the material therein onto the conveyor so that the material can be completely dispensed from the box.

We claim:

1. In combination with a road vehicle including a support frame, a lift frame mounted on said support frame for pivotal movement about an axis transverse to the longitudinal axis of said vehicle, a conveyor mounted on said lift frame and extending longitudinally of said vehicle, a material receptacle mounted on said lift frame for pivotal movement about an axis parallel to said conveyor and, adjacent one side thereof to discharge material onto said conveyor, means operative selectively to tilt said receptacle relative to said lift frame and to tilt said lift frame relative to said support frame, and means for driving said conveyor.

2. In combination with a road vehicle including a support frame, a lift frame mounted on said support frame for pivotal movement about an axis transverse to the longitudinal axis of said vehicle, a conveyor mounted on said lift frame and extending longitudinally of said vehicle, a material receptacle mounted on said lift frame for pivotal movement about an axis parallel to said conveyor and adjacent one side thereof to discharge material onto said conveyor, a fluid operator connected to said receptacle and to said support frame for raising said receptacle, and means for locking said lift frame selectively to said receptacle and to said support frame whereby said operator is operative to either tilt said receptacle sideways relative to said conveyor or to tilt said receptacle and lift frame rearwardly relative to said support frame.

3. In combination with a vehicle including a support frame, a lift frame mounted on said support frame for pivotal movement about an axis transverse to the longitudinal axis of said vehicle, a conveyor mounted on said lift frame and extending longitudinally of said vehicle, a material receptacle including a bottom wall having one side edge thereof pivotally mounted alongside said conveyor to permit movement of said receptacle relative to said conveyor and said lift frame, said receptacle having a side wall along the other side edge thereof and opposed end walls at opposite ends thereof, opposed end panels mounted on said lift frame and movable into overlapping relation with said opposed end walls as the receptacle is tilted relative to said lift frame, and means operative to raise and lower said lift frame relative to said support frame and to raise and lower said receptacle relative to said lift frame.

4. In combination with a vehicle including a support frame, a lift frame pivotally mounted on said support frame for movement about an axis transverse to the longitudinal axis of said vehicle, a dump box including a bottom panel rigidly attached to said lift frame and extending longitudinally of said vehicle and a bottom wall hingedly connected to said lift frame alongside one edge of said bottom panel for movement relative thereto about an axis extending longitudinally of said vehicle, said box including upstanding side walls on each said bottom panel and said bottom wall adjacent the side edges thereof remote from said one edge of said bottom panel, a conveyor mounted on said lift frame to move material along said bottom panel, means defining end walls for said box extending between said side walls, and means for raising and lowering said box relative to said lift frame and for raising and lowering said lift frame relative to said support frame.

5. The combination of claim 4 wherein the hinge connection between said bottom wall and said lift frame includes a first set of spaced tubular elements attached to said bottom wall, a second set of spaced tubular elements attached to said lift frame and interposed between the elements of said first set, and a pivot pin extending through said first and second sets of elements to form a piano-type hinge.

6. In combination with a vehicle including a support frame, a lift frame pivotally mounted on said support frame for movement relative thereto about an axis transverse to the longitudinal axis of said vehicle, a dump box including a bottom panel rigidly attached to said lift frame and extending longitudinally of said vehicle and a bottom wall hingedly connected to said lift frame alongside one edge of said bottom panel for movement relative thereto about an axis extending longitudinally of said vehicle, means for supporting said bottom wall on said lift frame to lie in a plane spaced above the plane of said bottom panel, said box including upstanding side and end walls attached to said bottom wall and said bottom panel, a conveyor having a portion thereof extending across said bottom panel for moving material therealong, and means for raising and lowering said box relative to said lift frame and for raising and lowering said lift frame relative to said support frame.

7. A material spreading device for use on a vehicle comprising, an elongated lift frame, means for pivotally mounting said frame on the vehicle for movement about an axis transverse to the longitudinal axis of said frame, a dump box including a bottom panel rigidly attached to said lift frame and extending longitudinally of said frame and a bottom wall hingedly connected to said lift frame alongside one edge of said bottom panel for movement relative thereto about an axis extending longitudinally of said frame, said box including upstanding side walls on each said bottom panel and said bottom wall adjacent the side edges thereof remote from said one edge of said bottom panel, said box including a front end wall attached to said bottom wall and to one of said side walls, a front end panel attached to said bottom panel and the other of said side walls and movable into overlapping relation with said front end wall as said bottom wall is tilted laterally of said frame, said box including a rear end wall and a rear end panel, means attaching said rear end wall and said rear end panel to said side walls, means pivotally interconnecting said rear end panel and said rear end wall for relative movement about an axis aligned with the hinge axis of said bottom wall, a conveyor mounted on said lift frame for moving material along said bottom panel, and means for raising and lowering said box relative to said lift frame and for raising and lowering said lift frame relative to the vehicle.

8. The combination of claim 7 wherein said rear end wall and said rear end panel are pivotally attached to said side walls for movement about an axis crosswise of said box, and means for selectively locking said rear end wall and said rear end panel in a position closing the end of said box.

9. A material spreading device comprising an elongated lift frame, means for mounting said lift frame on a vehicle for pivotal movement about an axis transverse to the longitudinal axis thereof, a conveyor mounted on said lift frame and extending longitudinally thereof, a dump box including a bottom wall and opposed side walls extending upwardly from said bottom wall, means pivotally mounting a portion of said box on said lift frame for movement about an axis extending longitudinally of said lift frame to feed material onto said conveyor, an end gate, means pivotally mounting said end gate on said side walls for movement relative thereto about an axis parallel to the pivot axis of said lift frame, means for releasably locking said end gate in a position closing the end of said box, said end gate including a plurality of separate sections, and means pivotally interconnecting said sections for movement relative to each other about the pivot axis of said portion of said box.

10. A material spreading device comprising an elongated lift frame, means for mounting said lift frame on a vehicle for pivotal movement about an axis transverse to the longitudinal axis of said frame, a multiple-section box mounted on said frame and including a bottom wall and opposed side walls extending upwardly from said bottom wall, said box comprising a first section including a portion of said bottom wall and one of said side walls and a second section including another portion of said bottom wall and the other of said side walls, hinge means connecting one of said sections to said lift frame for pivotal movement relative thereto about an axis extending longitudinally of said lift frame, an end gate including a first panel and a second panel, means attaching said end gate to said side walls for pivotal movement relative thereto to permit discharge of material when said lift frame is elevated, means for selectively locking said end gate to said box in a position closing the open end thereof, means pivotally interconnecting said panels for relative movement about an axis aligned with the axis of said hinge means, and means for elevating and lowering said lift frame and for elevating and lowering said one of said sections of said dump box relative to said lift frame.

11. A multiple-section dump box construction for use on a truck comprising two dump box sections each including a bottom wall and an upstanding side wall along one edge thereof, hinge means connecting said sections together for relative pivotal movement about an axis extending longitudinally of the box, an end gate comprising a pair of panels, means pivotally interconnecting said panels for movement about an axis perpendicular to the plane thereof, means pivotally connecting said end gate to said side walls for movement about an axis transverse to said side walls, and means for selectively locking said end gate to said box with the pivot axis of said panels aligned with the axis of said hinge means.

12. The combination of claim 11 wherein said panels have the contiguous portions thereof disposed in overlapping relation, and a guide bar on one of said panels spaced laterally therefrom for guidably receiving the overlapping portion of the other panel therebetween.

13. The combination of claim 12 including latch means on one of said panels engageable with the other of said panels for releasably locking said panels in alignment with each other.

14. The combination of claim 12 including a latch finger pivotally mounted on one of said panels for movement in a plane transverse to the other of said panels, said finger having a nose portion thereon engageable with the edge of the other of said panels, means yieldably urging said finger into engagement with said other of said panels, and cam means on said other of said panels engageable with said nose portion to move the finger to its release position when one of said box sections is tilted relative to the other of said sections.

15. The combination of claim 12 including a brace member having one end pivotally attached to one of said panels, and means on the other of said panels for slidably supporting said brace member thereon.

16. A multiple-section dump box construction for use on a truck comprising two dump box sections each including a bottom wall and an upstanding side wall along one edge thereof, hinge means connecting said sections for relative pivotal movement about an axis extending longitudinally of said side walls, an end gate comprising two panels, means pivotally interconnecting said panels for movement about an axis perpendicular to the plane thereof, means for releasably locking said panels together when said end panels are in longitudinally aligned relation to each other, said end gate having trunnions extending from opposite ends adjacent the upper edge thereof, means on said side walls releasably engaging said trunnions for swingably supporting said end gate, said end gate having latch pins extending from opposite ends adjacent the lower edge thereof, and means on said dump box releasably engaging said locking pins for pivotally supporting said end gate whereby said end gate is selectively swingable about either the upper or the lower edge thereof.

17. The combination of claim 16 including means on said end panels and on said box defining a locating pin and socket aligned with the pivot axis of said panels and the axis of said hinge means adapted to interfit when said end gate is closed to pivotally support the end panels on the box for movement about the hinge axis thereof.

18. The combination of claim 17 wherein said means for pivotally supporting said locking pins is movable longitudinally of the box to draw the end gate to its closed position and thereby move said locating pin into said socket and is operative to pivotally support said locating pins when the lower edge of the end gate is spaced from the end of the dump box with said locating pin disengaged from said socket to permit swinging of said end gate about said locking pins.

19. The combination of claim 17 wherein said means for supporting said locking pins includes a latch bar mounted on each side of said box and movable longitudinally thereof, said latch bars having a first notch for receiving said locking pins to draw said end gate to its closed position when the latch bar is retracted, said latch bars having a second notch spaced longitudinally from the first notch for receiving the locking pins and pivotally supporting the same with the lower end of the end gate spaced from the box and with the locating pin disengaged from said socket.

20. The combination of claim 19 including a lever mounted adjacent the front of said box and operatively connected to one of said latch bars to extend and retract the same, and a shaft having one end connected to said lever and extending crosswise of said box, means on the other end of said shaft to the other of said latch bars to operate the same, said shaft being articulated intermediate its ends adjacent said hinge means to permit one of said box sections to be tilted relative to the other section.

21. In combination with a truck including a frame and a cab on the forward portion of said frame, a multiple section material receptacle mounted on said frame rearwardly of the cab and comprising a first section mounted on said frame to extend along one side thereof, a conveyor mounted on said first section to move material longitudinally thereof, said receptacle including a second section hingedly connected to one side of said first section and adapted to be tilted laterally of said vehicle to feed material onto said conveyor, a spreader mounted at the front of said truck adjacent one side thereof, and an auxiliary conveyor mounted on the truck to extend from a point adjacent one end of said first conveyor to said spreader to receive material from said first mentioned conveyor and deliver the same to said spreader.

22. The combination of claim 1 including a spreader mounted on said vehicle adjacent one side thereof, and means mounted on the truck and extending from adjacent one end of said conveyor to said spreader for receiving material from said conveyor and for delivering the material to said spreader to be spread thereby.

23. In combination with a vehicle including a frame, a multiple-section material receptacle mounted on the frame, an elongated conveyor mounted on the frame and extending longitudinally of the vehicle in open communication with the receptacle throughout substantially the entire length thereof, said multiple section receptacle including at least one bottom panel hingedly mounted on said frame for pivotal movement relative to the conveyor about an axis extending alongside the conveyor and longitudinally of the vehicle whereby to feed material in the receptacle laterally of the vehicle and onto the conveyor when the bottom panel is swung upwardly about its pivot axis, means for selectively raising and lowering said bottom panel, and means for driving said conveyor to feed material longitudinally of the receptacle.

24. In combination with a vehicle including a frame, a multiple-section material receptacle mounted on the frame, an elongated conveyor mounted on the frame at one side of the vehicle and extending longitudinally of the vehicle in open communication with one side of the receptacle throughout substantially the entire length thereof, said multiple-section receptable including a first section having a wall extending upwardly from adjacent one side of the conveyor and a second section having a bottom panel hingedly mounted on the frame for pivotal movement relative to the conveyor and to the first section about an axis extending alongside the other side of the conveyor and longitudinally of the vehicle whereby to feed material in the receptacle laterally of the vehicle and onto the conveyor when the bottom panel is swung upwardly about its pivot axis, means for selectively raising and lowering said bottom panel, and means for driving said conveyor to feed material longitudinally of the receptacle.

25. In combination with a vehicle including a frame, a multiple-section material receptacle mounted on the frame, an elongated conveyor mounted on the frame and extending longitudinally of the vehicle in open communication with the receptacle throughout substantially the entire length thereof, said multiple-section receptacle including at least one bottom panel hingedly mounted on said frame for pivotal movement relative to the conveyor about an axis extending alongside the conveyor and longitudinally of the vehicle whereby to feed material in the receptacle laterally of the vehicle and onto the conveyor when the bottom panel is swung upwardly about its pivot axis, means for selectively raising and lowering said bottom panel, said receptacle having discharge openings adjacent the front and rear ends of said conveyor, and means for reversibly driving said conveyor to feed material longitudinally of the receptacle selectively to the front or the rear of the receptacle.

*26. A truck-type vehicle having a driving control station, a hopper for storing a supply of sand mounted upon said vehicle, a conveyor mounted longitudinally beneath said hopper, discharge openings at either end of said hopper adjacent the ends of said conveyor, a hydraulic motor driving said conveyor, a prime mover, a hydraulic pump driven by said prime mover, a fluid supply source, a valve directing fluid through said hydraulic motor in either of two opposite directions to drive said conveyor to convey sand optionally to either end of said hopper, said valve adjustable to direct the fluid whereby it by-passes said hydraulic motor and returns to said supply source.*

*27. A truck-type vehicle having a driving control station, a hopper for storing a supply of sand mounted upon said vehicle, a conveyor mounted longitudinally beneath said hopper, adjustable discharge openings at either end of said hopper adjacent the ends of said conveyor, a hydraulic motor driving said conveyor, a prime mover, a hydraulic pump driven by said prime mover, a fluid supply source, a valve having a plurality of hydraulic lines interconnecting said hydraulic motor, said pump, and said supply source therewith, said valve adjustable to direct fluid through said hydraulic motor in either of two opposite directions to drive said conveyor to convey sand optionally to either end of said hopper, said valve adjustable to direct the fluid whereby it by-passes said hydraulic motor and returns to said supply source, a handle for actuating said valve, and remote control means mounted at said control station for actuating said handle.*

*28. A truck-type vehicle having a control cab, a hopper for storing a supply of sand mounted upon said vehicle, a conveyor mounted longitudinally beneath said hopper,*

*adjustable discharge openings at either end of said hopper adjacent the ends of said conveyor, a hydraulic motor driving said conveyor, a prime mover, a hydraulic pump mounted upon said prime mover, a fluid supply tank, a valve having a plurality of hydraulic lines interconnecting said hydraulic motor, said pump, and said tank therewith, said valve directing fluid through said hydraulic motor in either of two opposite directions to drive said conveyor to convey sand optionally to either end of said hopper, said valve adjustable to direct the fluid whereby it by-passes said hydraulic motor and returns to said supply tank, a handle for actuating said valve, remote control means mounted in said cab for actuating said handle, and remote control means mounted in said cab for starting and controlling the speed of said prime mover.*

*29. A combined sand spreading and material delivering vehicle comprising a chassis, a control cab, a hopper mounted upon said chassis having discharge openings at either end thereof, a conveyor mounted longitudinally beneath said hopper and adapted to deliver sand to either of said openings, sand spreading mechanism mounted adjacent one end of said hopper, power means for actuating said sand spreading mechanism and said conveyor, and control means mounted within said cab for actuating said sand spreader and said conveyor whereby said conveyor may be driven to move sand in the direction of said sand spreading mechanism or whereby said conveyor may be reversed to deliver said sand to the end of said hopper opposite said sand spreading mechanism to discharge the same from said hopper.*

References Cited by the Examiner

The following references, cited by the Examiner, are of record in the patented file of this patent or the orginal patent.

UNITED STATES PATENTS

| | | |
|---|---|---|
| 296,089 | 4/84 | Wallwork. |
| 1,615,131 | 1/27 | Nein. |
| 1,742,058 | 12/29 | Coppock. |
| 1,757,038 | 5/30 | Burner. |
| 1,764,019 | 6/30 | Hardenbergh. |
| 2,029,995 | 2/36 | Flowers. |
| 2,534,558 | 12/50 | Ottenbacher. |
| 2,577,310 | 12/51 | Connelly. |
| 2,694,599 | 11/54 | Porter et al. |
| 2,697,609 | 12/54 | Chase et al. |
| 2,705,149 | 3/55 | Torrey. |
| 2,760,815 | 8/56 | Borde. |
| 2,762,628 | 9/56 | Terry. |
| 2,770,490 | 11/56 | Hockensmith. |
| 2,879,910 | 3/59 | Johnson. |

FOREIGN PATENTS

| | | |
|---|---|---|
| 870,666 | 3/53 | Germany. |
| 913,876 | 6/54 | Germany. |

T. GRAHAM CRAVER, *Primary Examiner.*

A. JOSEPH GOLDBERG, *Examiner.*